United States Patent
Durand

(10) Patent No.: US 12,556,534 B2
(45) Date of Patent: Feb. 17, 2026

(54) METHOD FOR MANAGING A REMOTE SERVER

(71) Applicant: THALES DIS FRANCE SAS, Meudon (FR)

(72) Inventor: Stéphane Durand, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 43 days.

(21) Appl. No.: 18/726,435

(22) PCT Filed: Dec. 6, 2022

(86) PCT No.: PCT/EP2022/084552
§ 371 (c)(1),
(2) Date: Jul. 3, 2024

(87) PCT Pub. No.: WO2023/126133
PCT Pub. Date: Jul. 6, 2023

(65) Prior Publication Data
US 2025/0080527 A1   Mar. 6, 2025

(30) Foreign Application Priority Data
Jan. 3, 2022 (EP) .................................. 22305002

(51) Int. Cl.
*H04L 9/40* (2022.01)
(52) U.S. Cl.
CPC ........ *H04L 63/083* (2013.01); *H04L 63/0853* (2013.01)

(58) Field of Classification Search
CPC .................. H04L 63/083; H04L 63/0853; H04L 63/0884
See application file for complete search history.

(56) References Cited

U.S. PATENT DOCUMENTS

| | | | | |
|---|---|---|---|---|
| 9,053,304 | B2* | 6/2015 | Ronda | H04L 63/0853 |
| 9,191,381 | B1* | 11/2015 | Popp | H04L 63/0823 |
| 10,521,623 | B2* | 12/2019 | Rodriguez | G06K 7/10297 |
| 11,210,412 | B1* | 12/2021 | Ghetti | H04L 9/0861 |
| 11,381,405 | B1* | 7/2022 | Sundaresan | H04L 9/3231 |
| 11,507,943 | B1* | 11/2022 | Ashley | G06Q 20/36 |

(Continued)

OTHER PUBLICATIONS

Bai P, Kumar S, Aggarwal G, Mahmud M, Kaiwartya O, Lloret J. Self-Sovereignty Identity Management Model for Smart Healthcare System. Sensors (Basel). Jun. 22, 2022;22(13):4714. doi: 10.3390/s22134714. PMID: 35808211; PMCID: PMC9269346. (Year: 2022).*

(Continued)

*Primary Examiner* — Khalid M Almaghayreh

(57) ABSTRACT

Provided is a method for managing a remote server that assigns to a user agent a session reference and a user authentication request. The user agent delegates the authentication request to an identity wallet that sends a proof of identity to the remote server. The user agent and the identity wallet are two separate devices, one of which generates and displays an ephemeral confirmation token and sends to the remote server a control token generated from the ephemeral confirmation token. The remote server grants rights associated to the session reference only if the proof of the identity is valid and if said checking is successful.

11 Claims, 3 Drawing Sheets

(56) References Cited

U.S. PATENT DOCUMENTS

| | | | | |
|---|---|---|---|---|
| 11,716,312 | B1* | 8/2023 | McNamara, Jr. | G06F 21/46 |
| | | | | 726/6 |
| 11,956,233 | B2* | 4/2024 | Tulshibagwale | H04L 63/08 |
| 12,105,842 | B1* | 10/2024 | Dods | G06N 3/084 |
| 2010/0205443 | A1 | 8/2010 | Zhao et al. | |
| 2015/0074774 | A1* | 3/2015 | Nema | H04L 63/062 |
| | | | | 726/5 |
| 2016/0142409 | A1* | 5/2016 | Frei | G06F 21/33 |
| | | | | 713/176 |
| 2017/0142108 | A1* | 5/2017 | Zhang | H04L 63/0807 |
| 2019/0303600 | A1* | 10/2019 | Hamel | H04L 9/3239 |
| 2022/0263818 | A1* | 8/2022 | Corella | H04L 9/3231 |
| 2023/0267414 | A1* | 8/2023 | Sundaram | G06F 21/53 |
| | | | | 726/8 |
| 2024/0370861 | A1* | 11/2024 | Benvenuti | H04L 9/3278 |
| 2024/0430266 | A1* | 12/2024 | Petit | G06F 21/6245 |
| 2025/0225271 | A1* | 7/2025 | Dods | H04L 63/0838 |

OTHER PUBLICATIONS

International Search Report (PCT/ISA/210) and Written Opinion (PCT/ISA/237) mailed on Apr. 14, 2023, by the European Patent Office as the International Searching Authority for current International Application No. PCT/EP2022/084552—[15 pages].

* cited by examiner

METHOD FOR MANAGING A REMOTE SERVER

FIELD

The present invention relates to methods for managing a remote server. It relates particularly to methods of proving identity of a user to get access to a service provided by a remote server.

BACKGROUND

Self-Sovereign Identity is a concept where end user is in control of their identity. A common embodiment of this concept is to let the user have a wallet where their credentials are stored so that the user doesn't need to rely to any centralized party to prove their identity to a third party. Typically, an identity wallet may be hosted on a portable device owned by the user. The identity wallet aims at proving the identity of a user. In the case of an authentication, the principle at play could be called transitive trust, whereby a Relying party (like a server) can authenticate the user because the user's wallet can authenticate the user and the Relying party can authenticate the wallet providing identity information about the user.

Various technology standards and components have been defined in this domain like OpenID foundation's "Self-Issued OpenId Provider" (SIOP) and W3C's Verifiable Credentials.

The document EP2873192-A1 discloses a method for adapting existing service provider servers to support two-factor authentication by leveraging an authentication server. The document U.S. Pat. No. 11,210,412-B1 discloses a method for using the presence of certain pre-specified software or configurations as an authentication factor. The document US2010/0205443-A1 discloses a method for self-sealed joint proof-of-knowledge and Diffie-Hellman key exchange protocols.

SUMMARY

While the technologies mentioned above help solving trust links at various levels, there are cases where the Relying party should be able to authenticate a specific instance of wallet. Indeed user authentication needs to relate to the specific wallet that is relevant to the Relying party in the context of use, with the exclusion of any other existing wallet.

There is need to enhance the security of user authentication based on an identity wallet.

The invention aims at solving the above mentioned technical problem.

An object of the present invention is a method for managing a remote server wherein the remote server assigns to a user agent both a session reference and a user authentication request associated to a user. The user agent delegates the user authentication request to an identity wallet and the identity wallet sends a proof of the identity of the user to the remote server as a response to the user authentication request. The user agent and the identity wallet are two separate devices. One of said devices:

Generates an ephemeral confirmation token,
Displays the ephemeral confirmation token to the user and sends to the remote server a control token generated from the ephemeral confirmation token. The other of said devices:

Gets a code entered by the user,
Communicates with the remote server for contributing to a checking of the code by using the control token.

The remote server grants rights associated to the session reference only if the proof of the identity is valid and if said checking is successful.

Advantageously, the control token may be generated by using a hash function applied to the ephemeral confirmation token.

Advantageously, the control token may be generated by using an identity function applied to the ephemeral confirmation token.

Advantageously, the remote server may execute the checking.

Advantageously, the user agent may generate the ephemeral confirmation token.

Advantageously, the identity wallet may generate the ephemeral confirmation token.

Advantageously, the identity wallet may send to both the remote server and the user agent a unique response identifier, the user agent may send to the remote server a message comprising both the unique response identifier and the code entered by the user, and the remote server may associate said proof of the identity with the session reference by using the received unique response identifiers received from both the user agent and the identity wallet.

Another object of the present invention is a system comprising a remote server, an identity wallet and a user agent. The remote server is configured to assign to the user agent both a session reference and a user authentication request associated to a user. The user agent is configured to delegate the user authentication request to the identity wallet. The identity wallet is configured to send a proof of the identity of the user to the remote server as a response to the user authentication request. The user agent and the identity wallet are two separate devices. One of said devices is configured to:

generate an ephemeral confirmation token,
display the ephemeral confirmation token to the user and send to the remote server a control token generated from the ephemeral confirmation token. The other of said devices is configured to:
get a code entered by the user,
communicate with the remote server for contributing to a checking of the code by using the control token.

The remote server is configured to grant rights associated to the session reference only if the proof of the identity is valid and if said checking is successful.

Advantageously, the system may be configured to generate the control token by using a hash function applied to the ephemeral confirmation token.

Advantageously, the system may be configured to generate the control token by using an identity function applied to the ephemeral confirmation token.

Advantageously, the remote server may be configured to execute said checking.

Advantageously, the user agent may be configured to generate the ephemeral confirmation token.

Advantageously, the identity wallet may be configured to generate the ephemeral confirmation token. identity Advantageously, the wallet may be configured to send to both the remote server and the user agent a unique response identifier, the user agent may be configured to send to the remote server a message comprising both the unique response identifier and the code entered by the user and the remote server may be configured to associate said proof of the identity with the session reference by using the received unique response identifiers received from both the user agent and the identity wallet.

Advantageously, the remote server may be a relying party hosted in a hardware appliance and said user agent and Identity wallet may be hosted in two separate hardware machines.

BRIEF DESCRIPTION OF THE DRAWINGS

Other characteristics and advantages of the present invention will emerge more clearly from a reading of the following description a of number of preferred embodiments of the invention with reference to the corresponding accompanying drawings in which.

DETAILED DESCRIPTION

The invention may apply to any remote server requiring a checking of user authentication based on an identity wallet. Identity wallets are also known as electronic identification wallet (eID). The invention is well suited for an identity wallet hosted on a portable device able to establish a communication channel with a remote server. The portable device may be a terminal equipment (e.g. mobile phone) or a tablet for instance.

Figure 1:
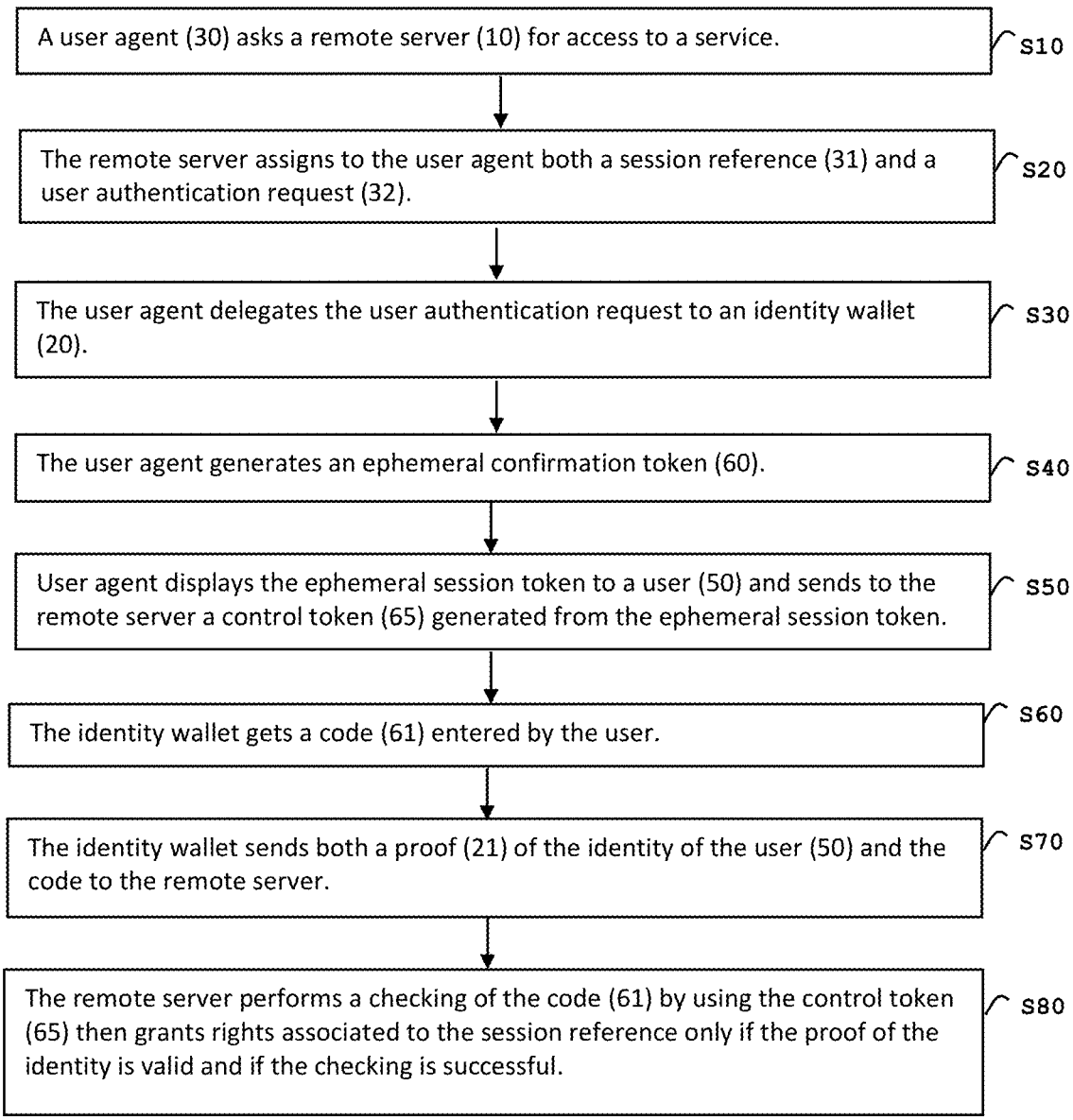
FIG. 1 shows a first exemplary flow diagram for enhancing security when identity of a user is checked by a remote server according to an example of the invention.

FIG. 1 depicts a first exemplary flow diagram for managing enhanced security during a phase where the identity of a user is checked by a remote server according to an example of the invention.

In this example, a user agent 30 is running on a hardware machine like a Personal Computer or a laptop. The user agent may be implemented as a web browser or a software application designed to get, render and facilitate user interaction with content found on the web.

The user agent is able to establish a communication channel with a remote server 10. Preferably, this communication channel may be secured by using known security mechanisms like Transport Layer Security (TLS) protocol. The remote server is able to provide one or more services.

At step S10, the user agent 30 may ask the remote server 10 for access to a service provided by the remote server. For instance, the user agent may try to access a bank account balance, to execute a gaming application or to consul a medical prescription/medical file.

Then at step S20, the remote server assigns to the user agent both a session reference 31 and a user authentication request 32. The remote server sends to the user agent both the session reference 31 and the user authentication request 32. It should be noted that the session reference is uniquely associated with the service to which access was requested by the user agent. By extension, the session reference 31 is considered uniquely associated with the user agent 30.

Then at step S30, the user agent delegates the user authentication request to an identity wallet 20.

At step S40, the user agent generates an ephemeral confirmation token 60. The value of the ephemeral confirmation token is supposed to be unpredictable for an entity external to the user agent. The ephemeral confirmation token may have a random value or a value randomly selected among a plurality of predefined values.

At step S50, the user agent displays the ephemeral confirmation token to a user 50 (i.e. the individual using the user agent) and sends to the remote server a control token 65 generated from the ephemeral confirmation token. The user agent may generate the control token 65 as a hash of the ephemeral confirmation token. The user agent may rely on a known hash functions like SHA-256 or MD5 for example.

At step S60, the user enters a code 61 to the identity wallet. In a normal use, the typed code 61 should be the ephemeral confirmation token that was displayed by the user agent at step S50.

At step S70, the identity wallet sends both a proof 21 of the identity of the user and the typed code 61 to the remote server. This sending may be done through a communication channel established on-the-fly between the remote server and the identity wallet. For instance, if a mobile phone hosts the identity wallet, the proof 21 of the identity of the user and the entered code 61 may be sent through a combination of a Telecom (or WI-FI or BLUETOOTH) protocol and the Internet.

Then at step S80, the remote server performs a checking of the code 61 by using the control token 65 received from user agent. Depending on the way the user agent has generated the control token 65, the remote server may apply the relevant function to the control token 65 or to the code 61. For instance, if the control token 65 is a hash of the ephemeral confirmation token 60, the remote server may compute a hash of the received code 61 and then compare the value of the control token 65 with the value of the hash of the received code 61.

The generation mode of the control token 65 may be hardcoded on both the user agent and the remote server or specified by an identifier exchanged between the user agent and the remote server.

The remote server also performs a checking of the validity of the received proof of identity. Then the remote server grants rights associated to the session reference only if both the proof of the identity is valid and if the checking is successful.

At this stage, the user agent has authorization to access the service initially asked to the remote server if the two checks are successful.

The checking of validity of the proof of identity can be implemented in a conventional way. For instance, it may rely on a certificate or equivalent PKI-like mechanism. The proof of identity is considered being issued by a "reputable issuer" whose identity (and reputation) can be independently verified. The proof of identity can be a certificate containing the id information, a W3C Verifiable credential. The reputable issuer can be a national authority, an employer, an online service provider or whatever identity information issuer relevant for the 'type' of identity that is expected. The verification process may involve validating the signature of the identity proof (as certificate or as W3C VC) with the public key of the issuer and then verifying that public key as authentic (because there is prior/independent knowledge of this key or because it is possible to ask a trusted 3rd party about its authenticity.)

Some variants may considered for the above-presented method. For example, the user agent may send the control token 65 to the remote server after step S60.

In some embodiments, the user agent may generate the control token 65 by using the identity function applied to the ephemeral confirmation token 60. In others words, the value of the control token 65 may be equal to the value of the ephemeral confirmation token 60.

Thanks to the some embodiments of the invention, the remote server may be confident on the fact that the person operating the user agent is the same as the individual operating the identity wallet. The binding between the user agent and the proof of identity received from the identity wallet allows the remote server to trust the user authentication for the appropriate session reference 31.

In some embodiments, the role of the user agent and the identity wallet may be reversed as regards the processing of generation the the of ephemeral confirmation token 60. The i identity wallet may be responsible to generate the ephemeral confirmation token 60. In this case, the identity wallet generates the control token 65 from the ephemeral confirmation token 60 then transmits the control token 65 to the remote server and displays the ephemeral confirmation token 60. In this case, the user agent captures the code 61 entered by the user and sends the code 61 to the remote server.

In the above-presented embodiments, the remote server 10 may be hosted in a hardware appliance and the user agent 30 and the Identity wallet 20 are two separate devices that may be hosted in a either a single hardware machine or two separate hardware machines.

Figure 2:
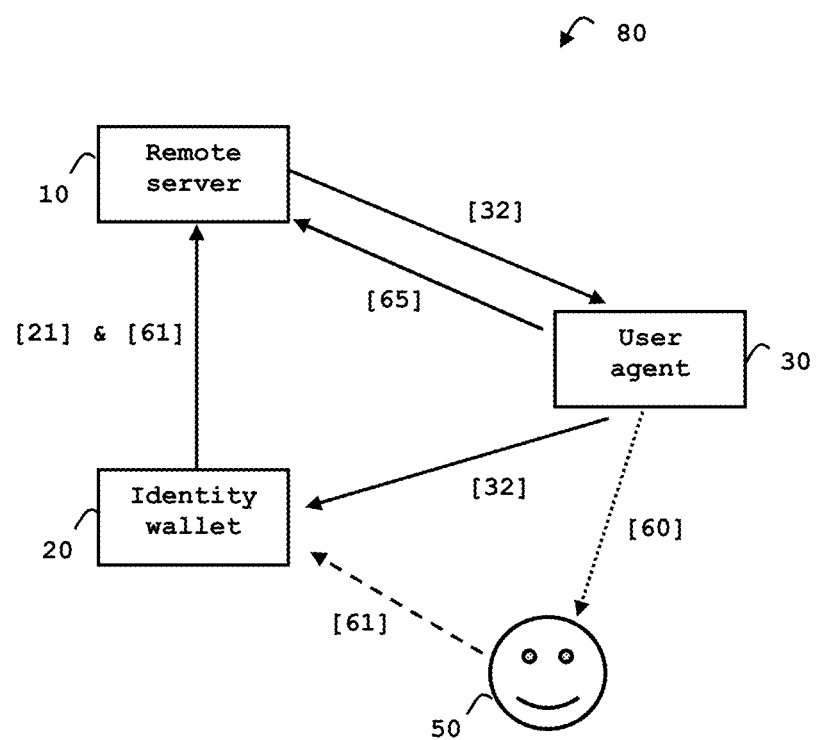
FIG. 2 shows a diagram of architecture of a system according to an example of the invention.

FIG. 2 depicts a diagram of architecture of a system 80 card according to an example of the invention.

In this example, the system 80 comprises a remote server 10, an identity wallet 20 and a user agent 30.

The remote server 10 and the user agent 30 may be able to establish a secure communication channel with each other using conventional security mechanisms like the HyperText Transfer Protocol Secure (HTTPS).

The remote server 10 may be configured to assign to the user agent 30 both a session reference 31 and a user authentication request 32 associated to a user 50 of the user agent. The user agent 30 may be configured to delegate the user authentication request to the identity wallet 20. The identity wallet 20 may be configured to send a proof 21 of the identity of the user 50 to the remote server 10 as a response to the receipt of the user authentication request.

The user agent 30 and the identity wallet 20 are two separate devices. One of these devices may be configured to generate an ephemeral confirmation token 60, to display the ephemeral confirmation token 60 to the user, to generate a control token 65 from the ephemeral confirmation token 60, and to send the control token 65 to the remote server 10.

The other of these devices may be configured to get a code 61 entered by the user and to communicate with the remote server for contributing to a checking of the code 61 by using the control token 65.

The remote server 10 may be configured to verify the validity of the received proof 21 of the identity and to grant rights associated to the session reference 31 only if the proof of the identity is valid and if the checking of the code 61 is successful.

In some embodiments, the remote server 10 may be configured to execute the checking of the code 61 by using the control token 65.

In some embodiments, the identity wallet 20 may be configured to send the code 61 to the remote server in a transformed form. For example, the transformed form can be obtained by encrypting the typed code 61.

In some embodiments, the user agent 30 or the identity wallet 20 may be configured to generate the control token 65 by using a hash function applied to the ephemeral confirmation token 60. The hash function may be SHA-2 or SHA-3 for instance.

In some embodiments, the user agent 30 or the identity wallet 20 may be configured to generate the control token 65 by using an identity function applied to the ephemeral confirmation token 60.

In some embodiments, the user agent 30 may be configured to generate the ephemeral confirmation token 60.

In some embodiments, the identity wallet 20 may be configured to generate the ephemeral confirmation token 60.

The remote server 10 may be hosted in a hardware appliance comprising one or more processors and a memory storing program instructions adapted to perform functions of the server 10 when executed by the one or more processors.

In some embodiments, the user agent 30 and the identity wallet 20 may be hosted in two separate hardware machines. For instance, the Identity wallet may be hosted in a cell phone or a connected watch while the user agent may be hosted in a laptop, another smartphone, tablet or a pocket PC (PDA).

In some embodiments, the user agent 30 and the Identity wallet 20 may be hosted in the same hardware machine.

In some embodiments, the remote server may be a Relying Party and the Identity wallet may be a Self Issued OpenID Provider (SIOP) as defined by OpenId foundation.

In some embodiments, the remote server and the Identity wallet may be adapted to manage proof of identity compliant with requirements of W3C'S Verifiable Credentials.

In some embodiments, the identity wallet may be configured to send to both the remote server and the user agent a unique response identifier 63. The user agent may be configured to send to the remote server a message comprising both the unique response identifier 63 and the code 61 typed by the user on the user agent. The remote server may be configured to associate the proof of the identity of the user (received from identity wallet) with the session reference by using the unique response identifiers received from both the user agent and the identity wallet.

Figure 3:
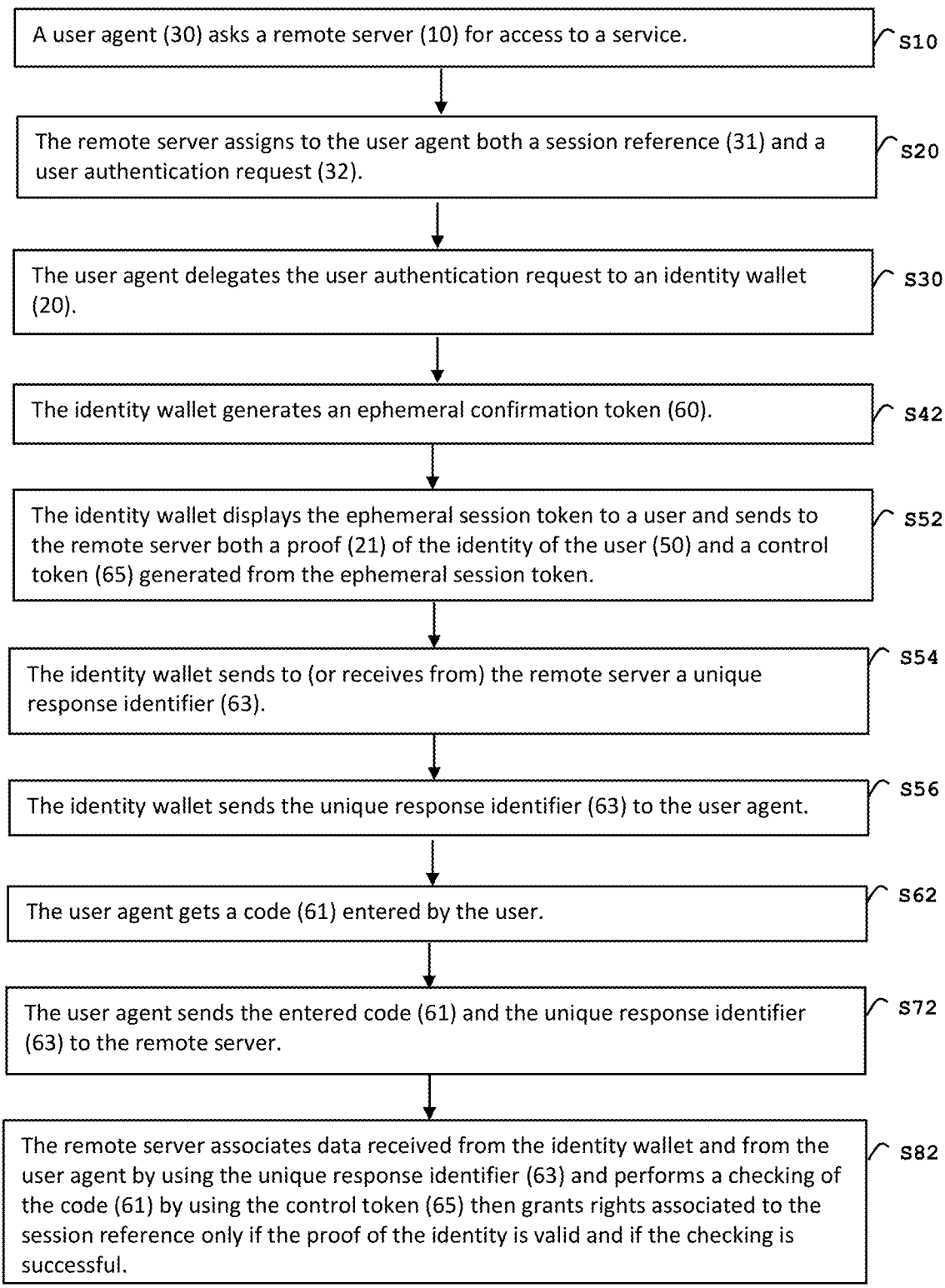
FIG. 3 shows a second exemplary flow diagram for enhancing security when identity of a user is checked by a remote server according to an example of the invention.

FIG. 3 depicts a second exemplary flow diagram for managing enhanced security during a phase during which a remote server checks the identity of a user according to an example of the invention.

In this example, a user agent 30 is running on a hardware machine (like a tablet PC or a desktop computer) hosting both the user agent 30 and the Identity wallet 20 (that are implemented as two separate software or hardware devices).

As in the example of FIG. 1, the flow of FIG. 3 may start with three Steps (S10, S20 and S30) which are identical to those of FIG. 1.

Then at step S42, the identity wallet generates an ephemeral confirmation token 60 having an unpredictable value.

At step S52, the identity wallet displays the ephemeral confirmation token 60 to the user 50 (i.e. the individual using the identity wallet), generates a control token 65 from the ephemeral confirmation token and sends to the remote server both the control token 65 and a proof 21 of the identity of the user. The identity wallet may generate the control token 65 as a hash of the ephemeral confirmation token.

At step 54, the identity wallet may generate a unique response identifier 63 and send it to the remote server. Alternatively, the remote server may generate a unique response identifier 63 and send it to the identity wallet.

At step 56, the identity wallet sends the unique response identifier 63 to the user agent.

At step S62, the user agent capture a code 61 entered by the user. For instance, the user may type the code 61 via a keyboard or a touch screen.

At step S72, the user agent sends both unique response identifier 63 and the code 61 (typed by the user) to the remote server. This sending is performed through the communication channel established during or before step S10 between the remote server and the identity wallet. The remote server considers that the received unique response identifier 63 and the received code 61 (both coming from the user agent) are linked together.

Then at step S82, the remote server uses the unique response identifier 63 received from the user agent and the unique response identifier received from the wallet to associate data received from the identity wallet and data received from the user agent. In other words, the remote server reconciles data received separately (from the identity wallet and from the user agent) thanks to the common the unique response identifier 63.

Then the remote server performs a checking of the code 61 by using the control token 65. Depending on the way the user agent has generated the control token 65, the remote server may apply an appropriate function to the control token 65 or to the code 61 before executing the checking operation. For instance, if the control token 65 is a truncation function of the ephemeral confirmation token 60, the remote server may compute an intermediate result by applying the truncation function to the received code 61 and compare the value of the control token 65 with the computed result.

The generation mode of the control token 65 may be predefined or dynamically synchronized between the user agent and the remote server.

The remote server also performs a checking of the validity of the received proof of identity. Then the remote server grants rights associated to the session reference 31 only if both the proof of the identity is valid and if the checking is successful.

At this stage, the user agent has authorization to access the service initially asked to the remote server if the two checks are successful.

In some embodiments, the user agent may generate the control token 65 by using the identity function applied to the ephemeral confirmation token 60.

In some embodiments, the identity wallet may generate both the ephemeral confirmation token 60 and the control token 65, the identity wallet may send to both the remote server and the user agent the unique response identifier. The user agent may send to the remote server a message comprising both the unique response identifier (received from the identity wallet) and the ephemeral confirmation token (entered by the user). The remote server may associate the proof of the identity with the session reference by using the received unique response identifiers received from both the user agent and the identity wallet.

If a hacker connects the remote server to get access to the service (without having the credentials to get access to this service), the remote server may send to the hacker (i.e. to the user agent of the hacker) both a session reference and a user authentication request. If the hacker has managed to compromise the connection between the remote server and the user agent of another user, he may replace the authentication request of the other user with his own user authentication request.

If the hacker has managed to compromise the connection between the identity wallet (that is not his own) and the user agent of another user, he may send to the identity wallet his own authentication request instead of the authentication request of the other user.

In both cases, the identity wallet is likely to send the proof of identity of a genuine user (i.e. different from the hacker) in response to the receipt of the authentication request associated with the hacker. As a result, the remote server may unduly grant rights to the hacker's session which thus stole the identity of the genuine user.

Thanks to some embodiments of the invention, the attempt of a malevolent person trying to usurp identity of a genuine user may be defeated. By providing the remote server with the possibility of checking that the identity wallet and the user agent are interacting with the same user, a possible attack can be thwarted.

Thanks to some embodiments of the invention, a temporary confirmation token allows to bind the user agent and the identity wallet. The temporary confirmation token does not leave a lasting mark on the remote server and does not compromise user's privacy.

The invention is not limited to the described embodiments or examples. In particular, the described examples and embodiments may be combined.

The invention is not limited to Self-Sovereign Identity and may apply to any kind of identity wallet.

The invention is well suited for systems in which a user installed an identity wallet in their own portable device like a smartphone, a tablet, a connected watch or a connected bracelet.

The invention claimed is:

1. A method for managing a remote server, wherein the remote server assigns to a user agent both a session reference and a user authentication request associated to a user, wherein the user agent delegates the user authentication request to an identity wallet and wherein the identity wallet sends a proof of the identity of the user to the remote server as a response to the user authentication request,
   wherein the user agent and the identity wallet are two separate devices, in that one of said devices:
   generates an ephemeral confirmation token,
   displays the ephemeral confirmation token to the user and sends to the remote server a control token generated from the ephemeral confirmation token,
   in that the other of said devices:
   gets a code entered by the user,
   communicates with the remote server for contributing to a checking of the code by using the control token,
   in that the remote server grants rights associated to the session reference only if the proof of the identity is valid and if said checking is successful,
   in that the identity wallet generates the ephemeral confirmation token,
   in that the identity wallet sends to both the remote server and the user agent a unique response identifier, in that the user agent sends to the remote server a message comprising both the unique response identifier and the code entered by the user and in that the remote server associates said proof of the identity with the session reference by using the received unique response identifiers received from both the user agent and the identity wallet.

2. The method according to claim 1, wherein the control token is generated by using a hash function applied to the ephemeral confirmation token.

3. The method according to claim 1, wherein the control token is generated by using an identity function applied to the ephemeral confirmation token.

4. The method according to claim 1, wherein the remote server executes said checking.

5. The method according to claim 1, wherein the user agent generates the ephemeral confirmation token.

6. A system comprising a remote server, an identity wallet and a user agent, wherein the remote server is configured to assign to the user agent both a session reference and a user authentication request associated to a user, wherein the user agent is configured to delegate the user authentication request to the identity wallet and wherein the identity wallet is configured to send a proof of the identity of the user to the remote server as a response to the user authentication request, wherein the user agent and the identity wallet are two separate devices, in that one of said devices is configured to:

generate an ephemeral confirmation token, display the ephemeral confirmation token to the user and send to the remote server a control token generated from the ephemeral confirmation token, in that the other of said devices is configured to:

get a code entered by the user, communicate with the remote server for contributing to a checking of the code by using the control token, in that the remote server is configured to grant rights associated to the session reference only if the proof of the identity is valid and if said checking is successful, in that the identity wallet is configured to generate the ephemeral confirmation token, in that the identity wallet is configured to send to both the remote server and the user agent a unique response identifier, in that the user agent is configured to send to the remote server a message comprising both the unique response identifier and the code entered by the user and in that the remote server is configured to associate said proof of the identity with the session reference by using the received unique response identifiers received from both the user agent and the identity wallet.

7. The system according to claim 6, wherein the system is configured to generate the control token by using a hash function applied to the ephemeral confirmation token.

8. The system according to claim 6, wherein the system is configured to generate the control token by using an identity function applied to the ephemeral confirmation token.

9. The system according to claim 6, wherein the remote server is configured to execute said checking.

10. The system according to claim 6, wherein the user agent is configured to generate the ephemeral confirmation token.

11. The system according to claim 6, wherein the remote server is a relying party hosted in a hardware appliance and wherein said user agent and Identity wallet are hosted in two separate hardware machines.

\* \* \* \* \*